United States Patent [19]

Smith

[11] Patent Number: 5,189,984

[45] Date of Patent: Mar. 2, 1993

[54] BIRD FEEDER ENCLOSURE

[76] Inventor: Robert F. Smith, 1913 Brockway, Saginaw, Mich. 48602

[21] Appl. No.: 821,626

[22] Filed: Jan. 16, 1992

[51] Int. Cl.⁵ .............................................. A01K 39/01
[52] U.S. Cl. ................................................ 119/52.2
[58] Field of Search ..................... 119/52.1, 52.2, 52.3, 119/57.8, 57.9, 61; D30/121, 122, 123, 124, 129, 131, 132, 133

[56] References Cited

U.S. PATENT DOCUMENTS

| | | | |
|---|---|---|---|
| 2,524,502 | 10/1950 | Wilkinson | 119/57.9 |
| 2,707,454 | 5/1955 | Wilkinson | 119/57.9 |
| 2,789,532 | 4/1957 | Hoebing | 119/61 |
| 2,841,116 | 7/1958 | Nichols et al. | 119/52.1 X |
| 3,086,499 | 4/1963 | Dilley | 119/57.9 |
| 4,327,669 | 5/1982 | Blasbalg | 119/57.8 |

Primary Examiner—Gene Mancene
Assistant Examiner—Thomas Price
Attorney, Agent, or Firm—John J. Swartz

[57] ABSTRACT

An enclosure for a conventional bird feeder having top and bottom portions pivotally secured to a suitable top or bottom support. A shroud extends about the sides and back of the enclosure and includes a front opening for ingress and egress of birds to and from a bird feeder which is disposed within the enclosure. A perch comprising a wall extends from the bottom portion beneath the opening. A weather vane is attached to the enclosure for rotating the enclosure to a position in which the opening is away from the force of the wind to protect the partially enclosed bird feeder from the elements while providing access for birds entering and leaving the enclosure.

15 Claims, 3 Drawing Sheets

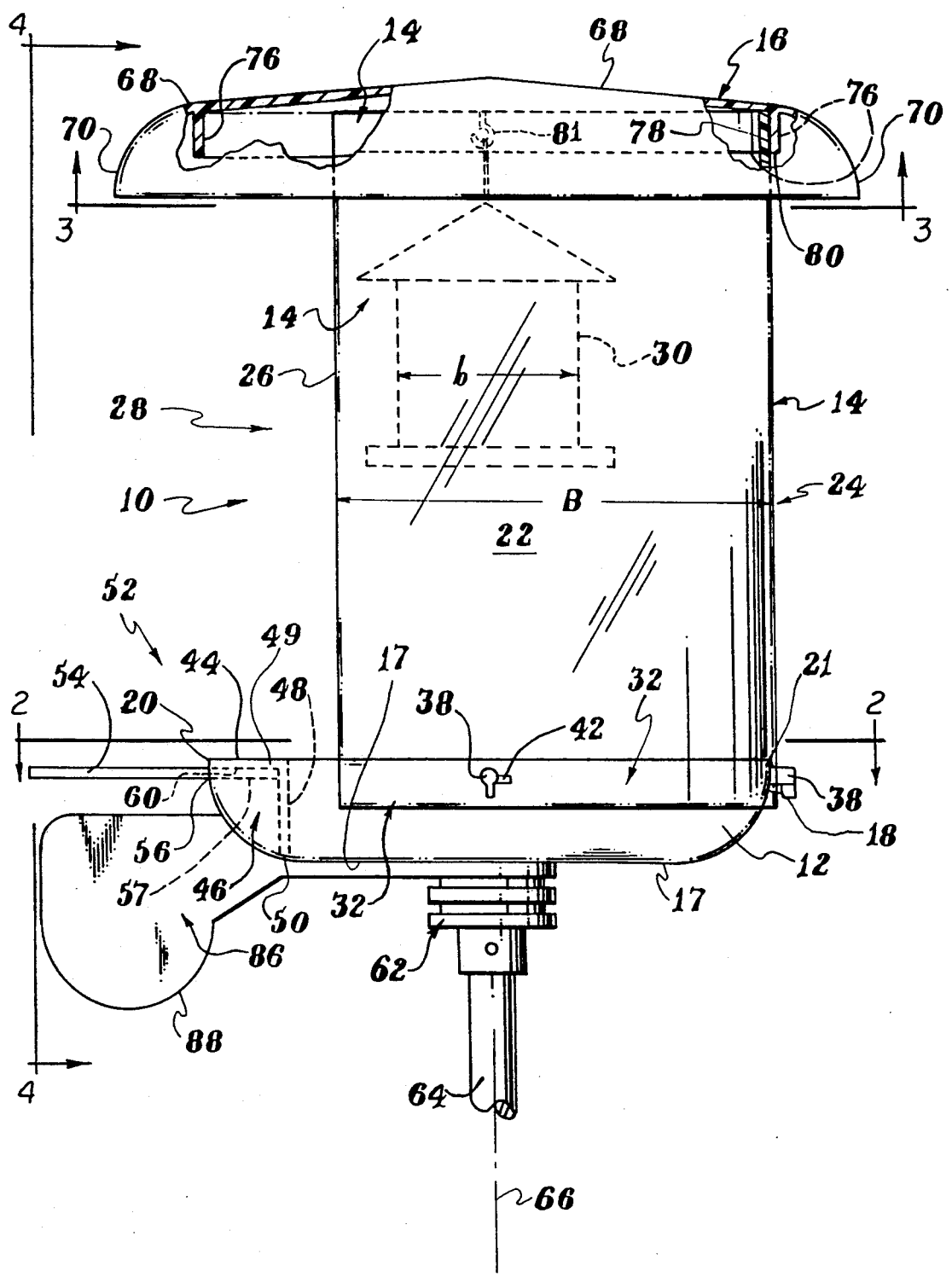

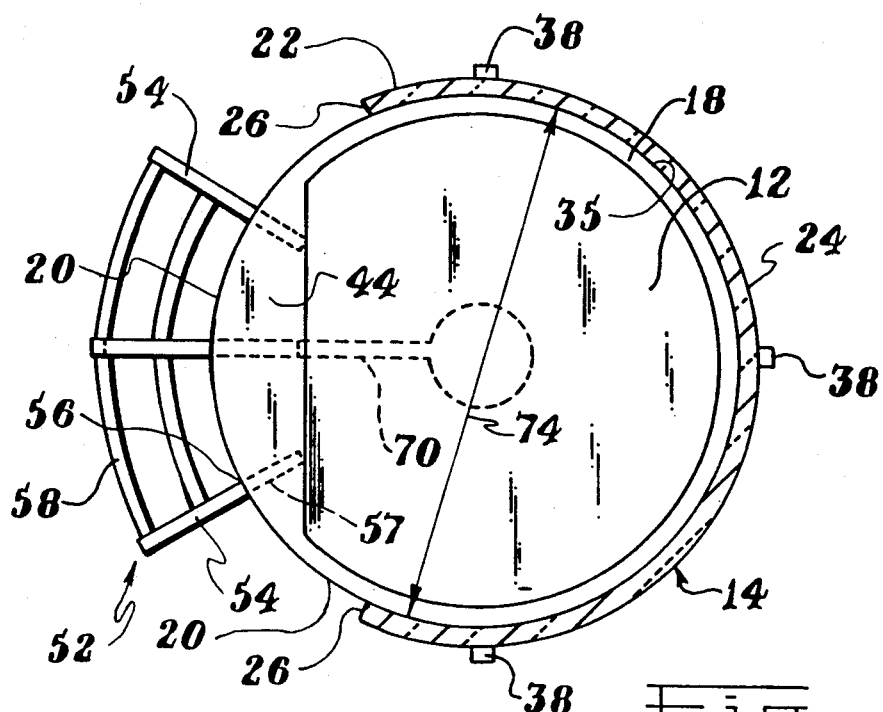
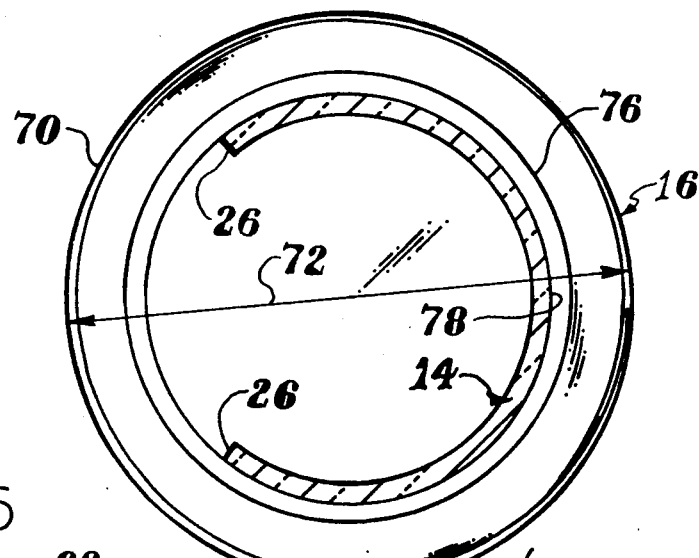
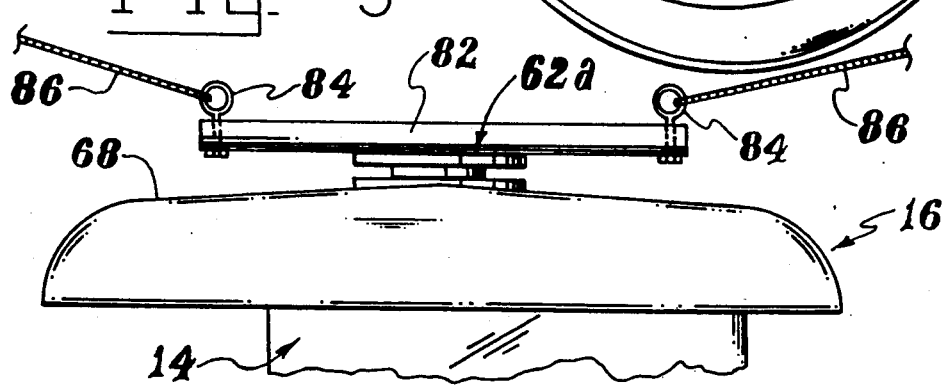

BIRD FEEDER ENCLOSURE

BACKGROUND OF THE INVENTION

1. Field of the Invention:

This invention relates to a bird feeder and more particularly to an enclosure for protecting the feeder's contents and preventing littering associated with conventional bird feeders.

2. Description of the Prior Art and Objects:

Birds feeding in a conventional bird feeder, tend to litter the underlying earth with seeds which are spilled and hulls which are rejected. Because of this litter, sometimes bird feeders are placed in less desireable locations than they otherwise would be without the litter. Accordingly, it is an object of the present invention to provide a bird feeder enclosure which will prevent littering associated with conventional bird feeders while protecting the feeder's contents.

It is another object of the present invention to provide a bird feeder enclosure which will catch the litter from a bird feeder in a bottom detachable tray.

It is another object of the present invention to provide a bird feeder enclosure which will keep the ground underlying a bird feeder free of litter.

It is another object of the present invention to provide a bird feeder enclosure of the type described including a bottom tray which will catch bird feeder litter and which can be easily removed to allow the user to dump the litter in a trash can or the like.

In a large number of bird feeders, the bird feed becomes wet from snow and/or rain and will clog and not properly feed. Accordingly, it is another object of the present invention to provide a bird feeder enclosure which will keep the conventional bird feeder drier than it otherwise would be.

It is another object of the present invention to provide a bird feeder enclosure which will allow birds to enjoy an unspoiled food supply and also feeder openings which do not become as clogged with moist, damaged food.

Birds are creatures of habit that tend to return to the location where food is regularly provided and if the bird feeder becomes clogged, the birds will leave the area and go to another food supply. It is another object of the present invention to provide a bird feeder enclosure which will minimize interference with birds' feeding habits.

The feeder enclosure constructed according to the present invention includes a shroud having an opening which will receive and pass a bird feeder to be mounted inside the enclosure. It has been found desireable that the opening be kept down-wind of any wind which might occur to protect the birds and the feeder therein from the elements. Accordingly, it is another object of the present invention to provide a bird feeder enclosure which can be selectively mounted via a bearing, either on a post or in suspended relation on an overlying support, such as a tree, for easy turning.

Another object of the present invention is to provide a bird feeder enclosure of the type described including a weather vane which will rotate the bird feeder enclosure about its vertical axis to a position in which the opening is down-wind.

Bird feeders can be constructed without a roof which makes the cleaning and filling of such bird feeders much easier. Unfortunately, if the feeder is constructed without a roof, rain and snow would be allowed to the feeders. Accordingly, it is an object of the present invention to provide an enclosure for a roofless bird feeder to protect the feed within the feeder and any birds within the enclosure from the elements.

Other objects and advantages of the present invention will become apparent to those of ordinary skill in the art as the description thereof proceeds.

SUMMARY OF THE INVENTION

A bird feeder enclosure comprising an upstanding transparent shroud extending about the sides and back of the enclosure and having an open front; an upwardly opening tray detachably mounted on the lower end of the shroud; a roof member detachably mounted on the upper end of said shroud; mechanism mounting one of the tray and roof member for rotation about a vertical axis and a weather vane mounted on the enclosure and operable in response to wind for rotating the enclosure about the axis to a position in which the opening is away from the force of the wind to protect the bird feeder and birds therein from the elements while providing access for birds.

DESCRIPTION OF THE DRAWINGS

The invention may be more readily understood by referring to the accompanying drawings, in which:

FIG. 1 is a side elevational view of a bird feeder enclosure constructed according to the present invention with a bird feeder mounted therein illustrated in fathom;

FIG. 2 is a top plan sectional view taken along the line 2—2 of FIG. 1;

FIG. 3 is a bottom plan sectional view taken along the line 3—3 of FIG. 1;

FIG. 5 is a side elevational view illustrating a slightly modified construction wherein the mounting bearing is mounted on the top wall to allow the enclosure to be hung from an overlying support such as a tree.

DESCRIPTION OF THE PREFERRED EMBODIMENT

Figure 4:
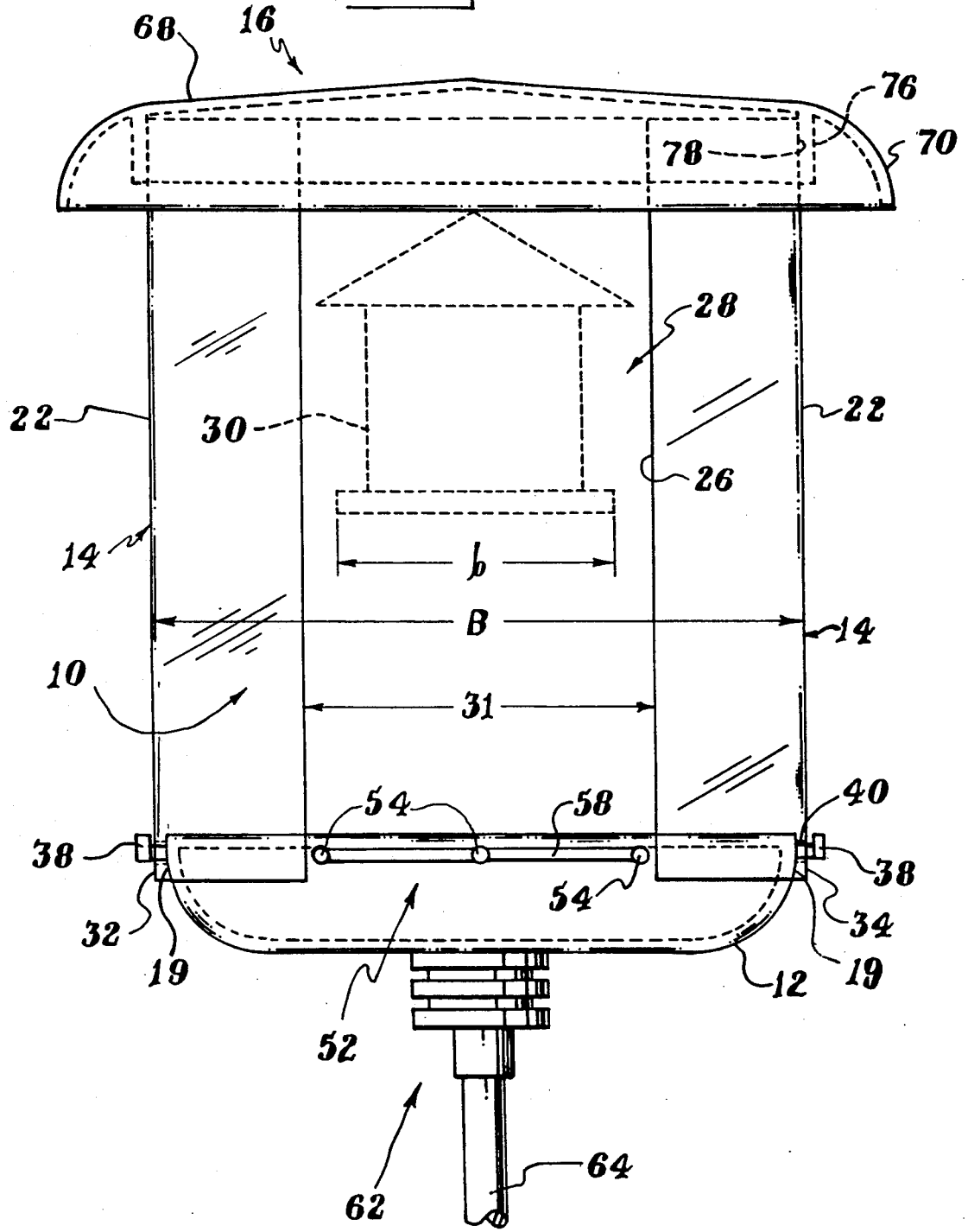
FIG. 4 is an end elevational view taken along the line 4—4 of FIG. 1.

A bird feeder enclosure, generally designated 10, constructed according to the present invention includes an upwardly opening bottom tray, generally designated 12, an upstanding shroud, generally designated 14, and a roof, generally designated 16.

The upwardly opening bottom tray 12, which may suitably comprise molded plastic, includes a bottom wall 17 and an integral, annular side wall 18 including opposite side flange portions spanning front and rear flange portions 20 and 21, respectively.

The shroud 14 includes opposite side wall shroud portions 22 spanned by a rear wall shroud portion 24. The shroud 14 is open at the front end 26 to provide an opening 28 to allow the passage of a commercially available bird feeder 30 as well as to allow the ingress and egress of birds (not shown). The breadth b of the bird feeder, which may be topless, is substantially less than the breadth B of the enclosure shroud 14 and substantially less than the width 31 of opening 28 so that the bird feeder 30 will easily pass through the opening 28 and be freely received within the shroud 14. The shroud 14 may suitably comprise clear or transparent plastic material which will allow the users to view the feeder 30 and birds disposed therein. The lower ends 32 of the side shroud portions 22 and the lower ends 34 of the rear shroud portions 24 are snuggly slidingly received in frictional engagement with the outer lower surface 35 and 37 of side wall shroud portions 22 and rear wall shroud portion 24, respectively.

The bottom tray 12 is detachably coupled to the shroud 14 via three pins 38 received in openings 40 and 42 provided in confronting portions of the side wall 18 and shroud 14, respectively. In this way, the bottom tray 12 and side shroud 14 can be easily separated for emptying the contents in the tray 12.

It should be noted that because the lower ends 32 and 34 of the shroud are disposed outwardly of the side and rear flange portions 19 and 21, any rain which impacts and runs down the outer surface of the shroud 14 will not pass into the underlying tray 12.

To inhibit birds from perching on the front flange portion 20 of annular flange 18 and removing seeds which might lie in tray 12, a cover wall 44 is mounted on the front flange portion 20 to cover a forward tray portion 46 of the tray 12 forward of the opening 28. A vertical wall 48 spans the rearward end 49 of the wall 44 and the inside surface 50 of the tray 12. The vertical wall 48 precludes seeds from being caught and deteriorating in the tray portion 46. The wall 44 will tend to prevent birds from perching on the flange portion 20, cover wall 44, and the forward tray portion 46 and throwing seeds, which might be lying in tray 12, out of the tray 12.

A grill type perch, generally designated 52, is mounted on the front flange portion 20. The perch 52 includes a plurality of radial spokes 54 received in radial rods or openings 56 provided in the front flange 20 and bearing against the underside 60 of cover wall 44. A plurality of radially spaced, arcuate perch rods 58 span the radially extending rods 54 to provide a perch for birds. A ball bearing assembly, generally designated 62, is fixed to the underside of the bottom wall 17 and is detachably mounted on a vertical, ground supported post 64 for allowing the unit 10 to freely rotate about a vertical axis 66.

The roof 16 includes a top wall 68 terminating in a downwardly extending annular flange or wall 70 which has a breadth 72 substantially greater than the breadth 74 of annular flange 18 to shield the tray 14 and feed disposed therein from the elements.

Depending from the top wall 68 is an annular flange 76 which is received in snug sliding frictional engagement with the exterior upper wall surface 78 of the shroud 14. If desired, suitable coupling pins, not shown but similar to pins 38, may be provided to couple the flange 76 to the upper portion 80 of the shroud 14. The top wall 78 also includes a central hook 81 on which the feeder 30 is suspended.

A weather vane 86, comprising a vertical paddle 88, is molded or otherwise integrally fixed to the bottom wall 17 of the tray 12 at a level below the level of the opening 28. The weather vane 86 will respond to the wind forces to rotate horizontally about the axis 66 to a position in which the vane 86 is down-wind and parallel to the wind direction. This will likewisely dispose the opening 28 down-wind.

MODIFIED CONSTRUCTION

A slightly modified construction is illustrated in FIG. 5, wherein similar parts are referred to by identical reference characters followed by the subscript A. As opposed to a bearing assembly 62 being mounted on the bottom wall 17, a bearing assembly 62a is mounted on the top wall 68a and includes a transverse mounting rod 82 having a set of eye bolts 84 which receive a plastic coated cables 89 that are attached to a tree or an overhead hanger.

THE OPERATION

The bird feeder 30 is filled with bird food and passed through the front enclosure opening 28 and hung from the top wall 68 of the roof 16. Birds will have free access to the feeder through the opening and the roof 16 will protect the device from the rain and other elements. The vane 86 will cause the enclosure 10 to rotate about its axis 66 so that the opening 28 is always downstream and down-wind to further protect the birds and the bird feeder 30.

If birds eat feed in the tray 12, the wall 44 will inhibit the birds from perching on the front flange 20 and from standing in the front tray area 46.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A bird feeder enclosure for detachably mounting a bird feeder on which birds can perch and feed, said bird feeder having a predetermined breadth, said enclosure including
    an upstanding shroud including a back wall and side walls spaced apart a breadth greater than said predetermined breadth; said side walls having
    rear edge portions joined to said back wall and
    front wall portions spaced apart a distance greater than said predetermined breadth and defining a front opening through which said bird feeder can pass;
    means for detachably mounting said feeder on said enclosure to allow said bird feeder to be moved from a position within said enclosure through said opening to a remote position without said enclosure;
    upwardly opening tray means detachably mounted on the lower end of said shroud for collecting any bird feed which might spill from said bird feeder;
    a roof member detachably mounted on the upper end of said shroud;
    means for mounting one of said tray means and said roof member for rotation about a vertical axis; and
    a weather vane mounted on said enclosure and operable in response to wind for rotating the enclosure about said axis to a position in which said front opening is away from the force of the wind to protect the bird feeder from the wind elements while providing access to the bird feeder enclosed therein.

2. The bird feeder enclosure set forth in claim 1 including a bird perch comprising a grill detachably mounted on a forward portion of said tray means at a level below the level of said opening.

3. The bird feeder enclosure set forth in claim 1 wherein said upstanding side walls have upper and lower ends, said back wall has upper and lower ends, said tray means including a bottom wall mounting an upstanding annular mounting flange which includes side flange portions disposed in abutting relation with said lower ends of said side walls of said shroud;

a back flange portion spanning said side flange portions and disposed in abutting relation with said lower end of said back wall of said shroud; and a front flange portion coupled to said side flange portions and disposed forwardly of said front opening.

4. The bird feeder enclosure set forth in claim 3 including a cover wall mounted on said front flange portion for covering at least a portion of said bottom wall of said tray means forward of said opening.

5. The bird feeder enclosure set forth in claim 4 including a bird perch comprising a grill detachably mounted on said front flange portion at a level below the level of said cover wall.

6. The bird feeder enclosure set forth in claim 5 wherein said front flange portion includes a plurality of spaced apart openings therein; said grill includes a plurality of circumferentially spaced, radially extending mounting rods spanned by arcuate perch rods;

said mounting rods including radially inner ends detachably received by said openings in said front flange portion and bearing against an underside of said coverwall.

7. The bird feeder enclosure set forth in claim 3 wherein said back and side flange portions are disposed radially inwardly of said lower ends of said back wall and side walls of said shroud.

8. The bird feeder enclosure set forth in claim 7 including a plurality of spaced apart openings in said lower ends of said back and side walls of said shroud; and coupling means mounted on said lower ends of said back and side flange portions detachably received by said openings for detachably coupling said tray means to said shroud.

9. The bird feeder enclosure set forth in claim 7 wherein said roof member has a breadth substantially greater than the breadth of said tray means.

10. The bird feeder enclosure set forth in claim 9 wherein said roof member includes a top wall terminating in an annular skirt and an annular mounting flange depending from said top wall radially inwardly of said skirt and frictionally receiving said upper end of said shroud.

11. The bird feeder enclosure set forth in claim 10 wherein said annular mounting flange is disposed radially outwardly of said upper end of said side walls and back wall.

12. A bird feeder enclosure comprising:

an upstanding shroud having an upstanding back and upstanding sides having spaced apart forward portions defining a front opening of such size as to provide access for a bird;

said shroud including upper and lower ends;

an upwardly opening tray detachably mounted on said lower end of said shroud;

a roof member mounted on said upper end of said shroud;

means coupled to one of said tray and said roof member for mounting said enclosure for rotation about a vertical axis;

weather vane means operable in response to wind for rotating the enclosure about said axis to a position in which said opening is positioned down-wind from the force of the wind to protect said enclosure from the wind;

said tray including an annular flange comprising side flange portions disposed in abutting relation with said lower ends of said sides of said shroud;

a back flange portion spanning said side flange portions and disposed in abutting relation with the lower end of said back of said shroud; and a front flange portion disposed forwardly of said open front.

13. The bird feeder enclosure set forth in claim 12 including a cover wall mounted on said front flange portion for covering at least a portion of said tray forward of said opening.

14. The bird feeder enclosure set forth in claim 13 including a bird perch comprising a grill detachably mounted on said front flange portion at a level below the level of said opening.

15. The bird feeder enclosure set forth in claim 13 wherein said back and side flange portions are disposed radially inwardly of said lower ends of said back and sides of said shroud.

* * * * *